United States Patent [19]

Nicholson et al.

[11] Patent Number: 4,856,642

[45] Date of Patent: Aug. 15, 1989

[54] SORTATION CONVEYOR

[75] Inventors: Robert J. Nicholson, Sheperdsville, Ky.; Anthony D. Jape, Doraville, Ga.

[73] Assignee: Figgie International Inc., Westlake, Ohio

[21] Appl. No.: 116,019

[22] Filed: Oct. 30, 1987

[51] Int. Cl.⁴ .............................................. B65G 47/46
[52] U.S. Cl. .................................... 198/365; 198/802
[58] Field of Search ...................... 198/365, 802, 472.1

[56] References Cited

U.S. PATENT DOCUMENTS

| | | |
|---|---|---|
| 3,034,665 | 3/1962 | Speaker . |
| 3,510,014 | 5/1970 | Speaker et al. . |
| 3,528,539 | 9/1970 | Speaker et al. .................. 198/365 |
| 3,630,394 | 12/1971 | Kingzett . |
| 3,669,245 | 6/1972 | Wooten et al. .................. 198/365 |
| 3,881,609 | 5/1975 | Ellis et al. ................. 198/365 X |
| 4,089,404 | 5/1978 | Venzke . |
| 4,143,751 | 3/1979 | Foster ............................... 198/365 |
| 4,174,773 | 11/1979 | Venzke . |
| 4,635,785 | 1/1987 | Prydtz ............................. 198/365 |
| 4,726,464 | 2/1988 | Canziani ........................... 198/365 |

Primary Examiner—Robert J. Spar
Assistant Examiner—D. Glenn Dayoan
Attorney, Agent, or Firm—Wood, Herron & Evans

[57] ABSTRACT

An improved lever arm for a tilt tray sortation conveyor has formula defined unlatching and tipping cam sections. The tipping cam section imparts a constant angular acceleration of about 20 radians/sec.² to the tray during positive tipping. Such angular acceleration produces a maximum tangential acceleration for any article on the tray, approximately equal to or less than the acceleration of a free-falling body. An improved tray latch or index plate has an inclined cam resisting rebound of the tray after initial tipping. Integral shock absorbers disperse impact forces in tray tip-up apparatus and resist elongation of tip-up mounting pin holes. Methods are claimed.

9 Claims, 4 Drawing Sheets

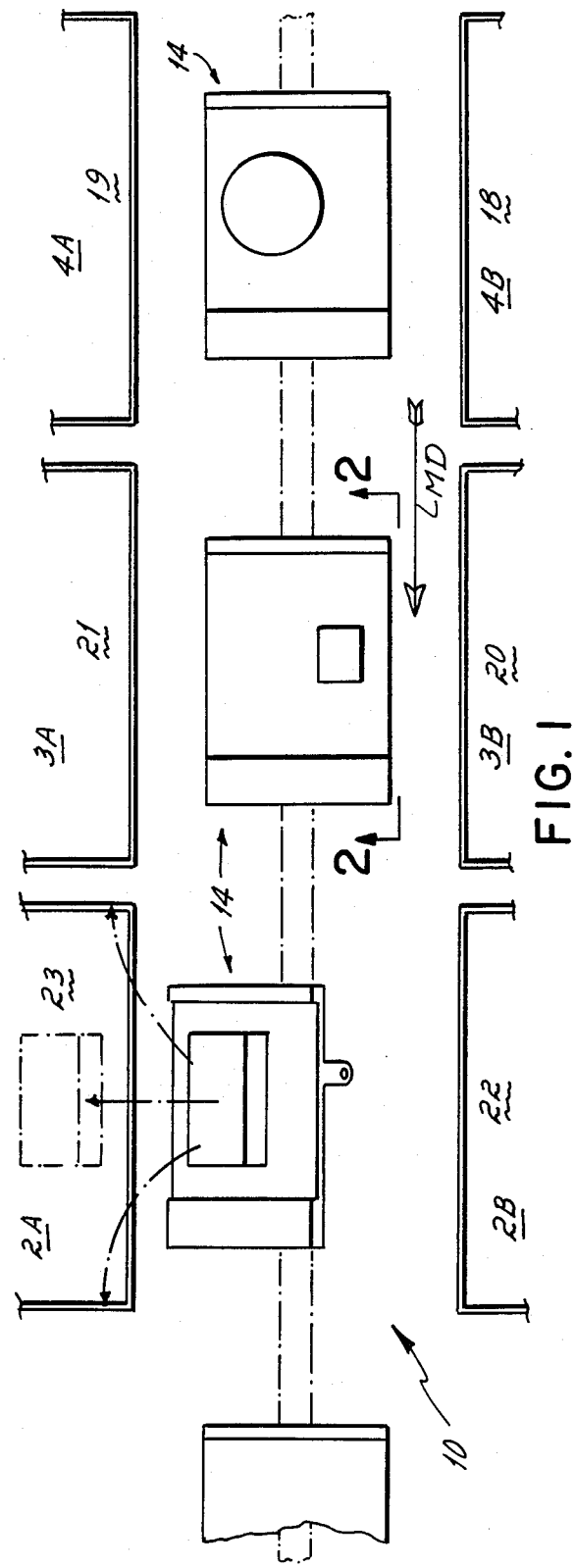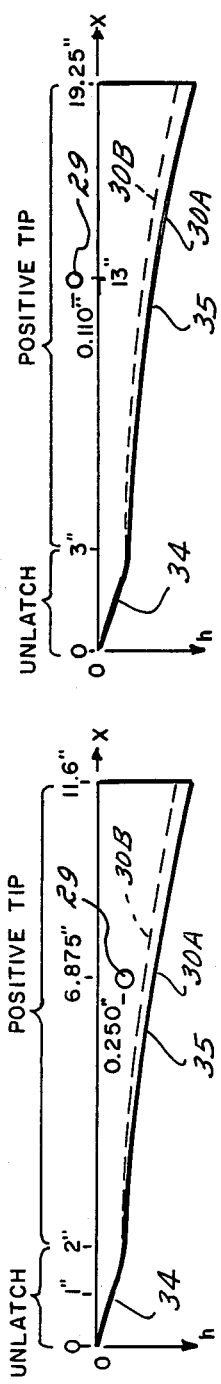

SORTATION CONVEYOR

This invention relates to tilt tray sortation conveyors and more particularly to improvements in such conveyors.

Tilt tray sortation conveyors have been in use for some time. Such sorters utilize a track, formed into a closed loop to support and guide a series of chain connected carriages. A tiltable tray is mounted on each carriage for tipping to either side at a sort location by remotely controlled tip-up apparatus mounted on either side of the track.

Objects to be sorted are loaded onto the trays either manually or automatically at an induction station. The loaded trays are conveyed along the track until they reach the appropriate sort location discharge chute disposed beside the track. The tray is then tipped at the appropriate time to discharge the package into the desired discharge chute.

In one prior system, each tray is mounted to a cast aluminum support which is pivoted on a four wheel carriage. The carriages are bolted to a roller chain which maintains their separation and pulls them along the track via an hydraulically driven drive sprocket. The supports are latched to the carriages to hold the support and tray in a level or horizontal position. A spring-loaded lever arm pivoted to the support has a ramp on each side for engaging a selectively activated tip-up roller to facilitate unlatching of the support from the carriage and then tipping of the tray.

When it is desired to tip the tray, an air cylinder lifts a roller tipped arm into the path of the ramp. Upon making contact with the roller, a first cam section of the ramp raises the lever arm against its spring bias and releases the latch. Continuing engagement of the roller with the remaining cam section of the ramp tips the tray to the desired side.

Two configurations of this type sorter are currently in production by applicant. They differ primarily in the weight capacity of the objects they can sort. One, for example, is intended for objects weighing up to 200 lb, while the other is intended for objects weighing up to 50 lb.

Details of such systems and variations thereof are also shown in several prior patents belonging to applicant. A general system is described in U.S. Pat. No. 3,034,665. One type of unlatch and tipping ramp is described in U.S. Pat. No. 3,510,014, and another in U.S. Pat. No. 3,630,394. A tip-up and mounting apparatus is disclosed in U.S. Pat. No. 4,174,773 and a modified yieldable latch is disclosed in U.S. Pat. No. 4,089,404. These patents are incorporated herein by reference for further background information.

While the tilt tray sortation conveyors now produced by applicant have found many applications and uses, current sortation environments require high sortation throughput which is beginning to exceed the design parameters of the current systems. Applications tend to be heading toward handling smaller packages and higher speeds, while current systems tend to work best in low speed, heavy duty applications. Increasing sortation throughput requirements demand conveyor or carriage speeds which have gradually increased to double the original most efficient design speeds of the present systems.

When considering the desirability of increased sortation throughput, it is not generally suitable to merely increase the speeds of the current carriage and tray structures, due in part to the relationship of the speed of the carriage and the shape of the cam or ramps on the lever arm. This relationship plays a very important role in determining the characteristics of the tray tipping and article discharge action. When the carriage speed and the ramp shapes are correctly matched, the objects on the tray are smoothly unloaded. When the two are not matched, however, many problems result.

For example, the acceleration of the tray in a tipping direction, which is perpendicular to the carriage movement, is a function of both carriage speed and cam or ramp shape. As carriage speeds are increased, tray tipping accelerations are increased. Packages on the rising side of the trays can be catapulted off, missing the target discharge chute. Where the tray acceleration exceeds that of a falling body, packages on the descending tray side are left with no support and also "fly". Since the packages may be highly varied in shape and weight, the flight characteristics are highly varied, random, and cannot be accurately anticipated for a particular sort or discharge operation.

Of course, one way to accommodate increased carriage speeds and increasing tilt tray acceleration is to simply widen the target mouth of the discharge chute, to a condition where all packages will be received regardless of their "flight" parameters. This tends, however, to detract from overall sorter throughput since it decreases the number of sort stations or discharge chutes for a given conveyor length. Even though the carriages run faster, there are less sort stations and fewer sort possibilities. It is thus difficult to increase sortation throughput merely by increasing carriage speed.

There are additional problems associated with increasing the carriage speeds of tilt tray sorters of present construction. For example, when tray speeds are increased, the consequential increasing tray acceleration can cause packages or articles to tumble. While certain article shapes are more prone to tumbling than others, any tumbling is undesirable for several reasons. First, tumbling of fragile packages may cause breakage or damage to products therein. Secondly, tumbling may interfere with sortation or conveying controls. In some instances a readable code is applied to a selected surface of a package. Scanners read the code on a discharging package for confirmation or downstream control. A tumbled package may not present the code in proper position for scanning. Thirdly, tumbling upsets the orientation of the package. A particular package orientation may be desired for palletizing, further conveying or the like.

In addition, operation at higher speeds results in excessive mechanical wear from impacts between components. At higher speeds the lever arm actuated index plate bounces off the latching pin causing improper interaction between the tip up roller and the index arm. Loads are catapulted, or the rebounding trays relatch in horizontal position and trap light packages, carrying them beyond the sort location. Overall noise levels are excessive.

There have been several attempts at providing improved ramps on the lever arms. U.S. Pat. No. 3,510,014 provides a ramp having a steep incline for unlatching and a lesser incline for tilting. U.S. Pat. No. 3,630,394 attempts to define a ramp shape either in the form of a parabola, which is in part a function of carriage speed, or in the form of an arc of a specific circle. Nevertheless, present day increased sortation throughput requires greater tray acceleration control and a greater reduction in forces exerted on the components of the entire system than can be provided by these prior structures. The lever arm ramps of these disclosures are attended with the problems noted when operated at currently desired speeds.

Accordingly, it has been one objective of this invention to provide an improved sortation conveyor to facilitate greater sortation throughput.

A further objective of this invention has been to provide improved unlatching and tipping cam shapes for the lever arm of a tilt tray sortation conveyor.

A further objective of the invention has been to provide an improved lever arm for a tilt tray sortation conveyor capable of operation at higher speeds, but less noise, than the current similar sorters described above.

A still further objective of the invention has been to increase sortation throughput in a tilt tray sortation conveyor without undesirable package tumbling.

Another difficulty with increasing the operational speed of tilt tray sortation conveyors lies in the tray latch and unlatch mechanism, such as that shown in U.S. Pat. Nos. 3,510,014 and 3,630,394. These systems utilize a latch plate, mounted on the spring biased lever arm, cooperating with a latch pin disposed on the carriage. Initial lifting of the lever arm raises the latch plate to release a detent therein from the pin and thus unlatch the tray for subsequent tilting.

Where speeds are increased, the acceleration of the tipping trays are significantly increased and the trays, particularly when lightly loaded, can rebound or bounce back and re-latch after passing the tip-up roller. This can occur so quickly as to tip or recapture a package intended for ejection, and to carry it past the pre-designated sort location.

It accordingly has been a further objective of the invention to provide an improved latch and unlatch apparatus for a tilt tray sortation conveyor.

A further objective of the invention has been to provide an improved latch plate to resist rebound of tiltable trays in a sortation conveyor.

Increased carriage speeds in a tilt tray sortation conveyor also produce greater impacts and wear on the associated tip-up components of the systems, such as that shown in U.S. Pat. No. 4,174,773. With increasing speeds, even the inclined unlatch ramps of the prior lever arms, hit the tip-up rollers at speeds which generate excessive forces on the system. These forces are transmitted through the tip-up rollers and arms to the tip-up mounting pins and channels in which they are journalled. This causes elongation of the pin mounting holes, more noise, and eventually sheared pins which must be replaced.

It has thus been a further objective of the invention to provide improved tip-up apparatus.

A further objective of the invention has been to provide improved tip-up mounting apparatus capable of sustaining and dispersing impact loads placed therein by tilt tray apparatus operating at increasing line speeds.

A further objective of the invention has been to provide a tilt tray sortation conveyor having improved high speed durability, smoothness, quietness and minimum impact loading.

A further objective of the invention has been to provide a tilt tray sorter with more uniform tray tipping to maintain or reduce the width of current sortation locations or discharge chutes despite increased sortation speeds.

To these ends, a preferred embodiment of the invention includes an improved spring-loaded lever arm for a tilt tray sortation conveyor. A lower arm surface comprises a ramp having a forward unlatching cam section and a rearwardly extending tipping cam section particularly shaped or profiled as a function of a predetermined line speed to provide a constant tray tipping angular acceleration during positive tray tipping by a tip-up roller selectively raised into the ramp path. The constant angular tray tipping acceleration for the predetermined line speed is selected so that tangential acceleration realized at even the outermost portions of the tray is about equal to, or slightly less than, the acceleration of a free-falling body. Preferably, this constant angular acceleration is about 20 radians per second squared (20 radians/sec$^2$). Stated in another way, the angular acceleration imparted to the tray and object thereon is selected such that none of its linear components are sufficient to cause the article on the tray to fly. Such components have maximum values approximately equal to or less than the acceleration of a free-falling body.

Such tray acceleration is not too fast, so as to either catapult a package off the rising side of the tray or drop away from a package on the descending side of the tray. Yet the acceleration imparts sufficient velocity to cause the tray to tip to a maximum tip angle of about 37°. This insures that packages disposed on any portion of the tray will begin to slide off the tray within a predetermined time, and distance, from tip-up actuation. The unlatch cam section of the ramp is shaped as a function of the predetermined line speed to provide gentle initial unlatch impact with the tip-up roller, positive unlatching and a smooth transition into the tipping cam section.

The desired cam profiles according to the invention are neither a parabolic segment, nor a circular arc.

In one embodiment of the invention, for a predetermined line speed of about 330 feet per minute, (and precisely 329 feet per minute), where X equals the linear dimension measured in a rearwardly direction along the ramp from the point where unlatching commences, and h equals the height for a particular X distance along the ramp; the profile of the unlatching cam from $X=0''$ to $X=1''$ is:

$$h=0.315X^2, \text{ and from } X=1'' \text{ to } X=2'',$$

$$h=0.315+0.560(X-1)-0.264(X-1)^2.$$

The profile of the outside edge of the tipping cam, from $X=2''$ to $X=11.6''$, is:

$$h=0.595+4\,\text{TAN}(0.002425(X-0.6)^2);$$

and the inside tipping cam edge profile is:

$$h=0.595+2.750\,\text{TAN}(0.002425(X-0.6)^2),$$

where the inside and outside edges are separated by 1.25''.

It will thus be appreciated that the unlatch cam surface is from $X=0''$ to $X=2''$ and the tipping cam surface is from $X=2''$ to $X=11.6''$. The tipping cam surface is preferably twisted as suggested by the above formulas so as to maintain line contact with the tip-up roller during positive tray tipping.

In another embodiment of the invention, for a predetermined line speed of about 500 feet per minute, the profile of the unlatching cam from X=0" to X=1.5" is:

$$h=0.1789X^2;\text{ and,}$$

from X=1.5" to X=3" is:

$$h=0.4025+0.466(X-1.5)-0.1555(X-1.5)^2$$

The outside edge profile of the tipping cam, from X=3" to X=19.25", is:

$$h=0.7516+4\ TAN(0.001(X-3)^2);$$

and the inside tipping cam edge profile is:

$$h=0.7516+2.750\ TAN(0.001(X-3)^2),$$

where the inside and outside edges are separated by 1.25".

The unlatching cam surface is from X=0" to X=3" and the twisted tipping cam surface is from X=3" to X=19.25".

While the shape of the unlatch cam surface in each embodiment is a parabola, the shape of the tipping cam surface is neither a parabola nor a circle, but is optimized as described to provide constant tray tipping angular acceleration during positive tipping for the particular predetermined line speed in each case.

Articles on trays so equipped and operated at approximately the stated speeds are positively controlled. They simply slide from the trays into the sort location discharge chute with no undesirable catapulting or "flight" characteristics.

In another aspect of the invention, an improved latch or index plate is provided with a cam surface presenting an incline to the latch pin as the tray and index plate move to a tray tipped position. This incline and its peak in an intermediate section of the latch plate cam surface constitute an "overcenter" structure which resists any tray rebound from a tipped position toward an untipped or horizontal position. Such structure utilizes the spring bias of the lever arm, and thus of the latch plate, to resist undesirable re-latching of a rebounding tray after the lever arm passes the tip-up roller. The trays are thus positively tipped and maintained in a tipped condition to prevent recapture of a discharging package.

In still another aspect of the invention, an improved tip-up includes integral shock absorbers, each shaped like a washer and disposed on a mounting pin on each side of the tip-up arm between the arm and one opposing leg of a mounting channel. A preferably hexagonally-shaped integral boss protrudes from the washer-shaped section of each shock absorber through a mounting aperture in the channel leg.

The mounting pin is held by the channel at an angle of about 45° to the linear conveying direction of the carriages. The washer and boss segments of the shock absorber transmit tip-up impact forces over a much larger section of the channel surfaces than did the mounting pin when it was simply disposed in a hole in the channel leg. Hole elongation and pin shearing is effectively resisted. Identical shock absorbers are used between the lower end of the tip-up actuator and the channel legs for similar function at that location. Such shock absorbers reduce maintenance and effectively reduce noise due to tip-up actuation and impact of the lever arm by the tray lever structure.

A further shock absorber in the form of a yieldable annulus is disposed on the base web of the tip-up mounting channel. This further cushions impact and reduces noise.

Accordingly, the invention provides a tilt tray sortation conveyor capable of operation at high line speeds to increase sortation throughput. Tray tipping and discharge characteristics for various packages, shapes and weights are customized and uniform for predetermined line speeds, permitting the narrowest possible sort locations dimensions and maximum number of sort locations for a given length conveyor sortation section and line speed. Sort accuracy is improved, noise and maintenance are reduced, and throughput is enhanced.

These and other advantages will become readily apparent from the following detailed description of preferred and alternative embodiments of the invention; and from the drawings in which:

FIG. 1 is an illustrative top plan view of a tilt tray sortation conveyor according to the invention;

FIG. 5 is a plan view showing one embodiment of a lever arm profile for a conveyor according to the invention having a predetermined line speed of about 330 feet per minute; and FIG. 6 is a plan view showing one embodiment of a lever arm profile for a conveyor according to the invention having a predetermined line speed of about 500 feet per minute.

Figure 2:
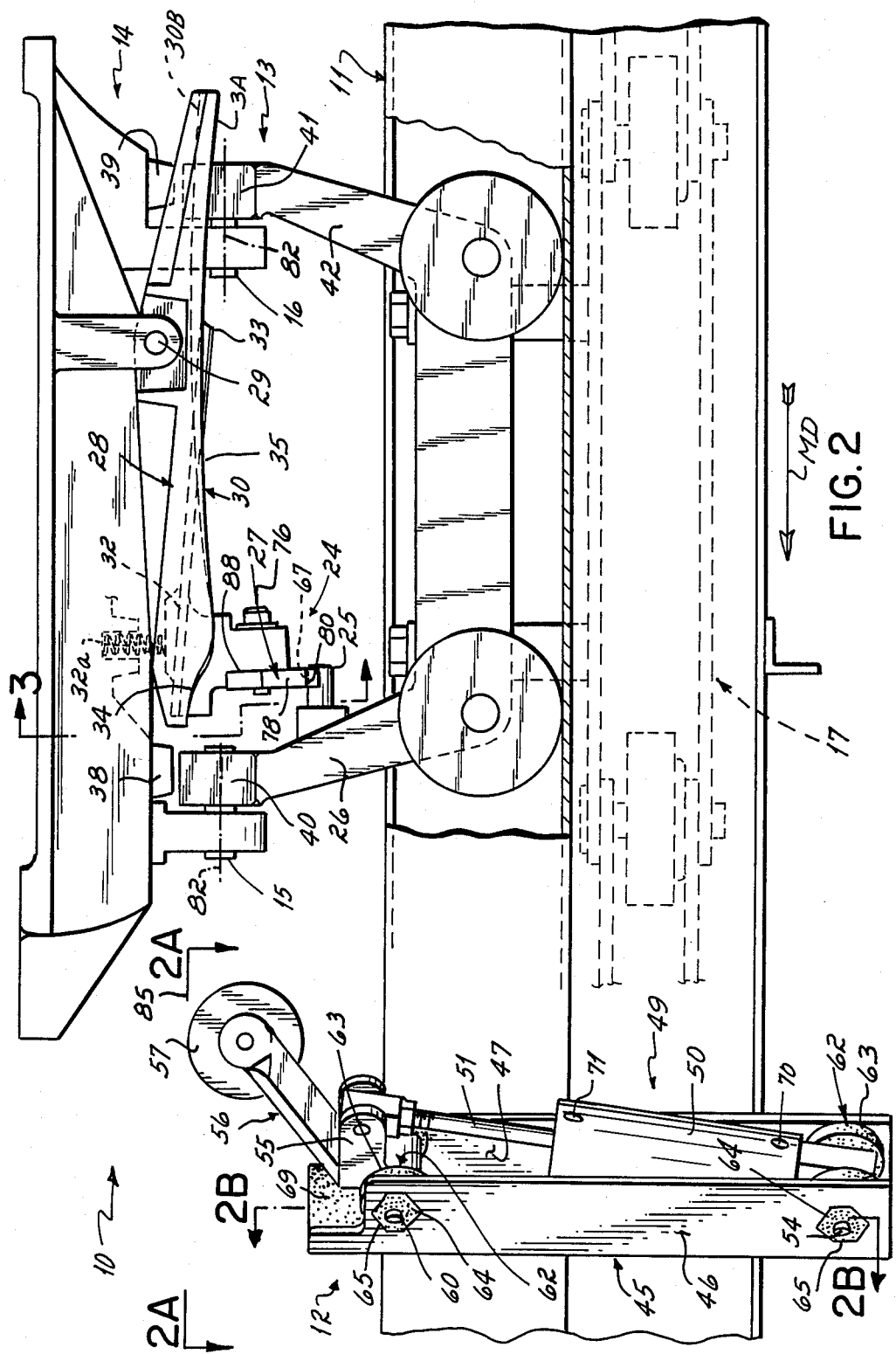
FIG. 2 is a cross-sectional view taken along lines 2—2 of FIG. 1.

Turning now to the drawings and first to FIG. 2 thereof, there is shown in the figure a portion of a tilt tray sortation conveyor 10. Segments of the conveyor 10 as shown in FIG. 2 include a track 11, a tip-up apparatus 12, a wheeled carriage 13 and a tilt tray assembly 14. The tilt tray assembly 14 is pivoted to carriage 13 by forward and rearward trunions 15 and 16 for tilting about a pivot axis to either side at an angle of about 37° from horizontal. The carriages 13 are secured to a driven roller chain 17 traveling in track 11.

A plurality of carriages 13 together with tray assemblies 14 are linked together and pulled along the track 11 by roller chain 17 past a plurality of sort locations 18 through 23 (FIG. 1). These sort locations are illustrated in FIG. 1 in opposite disposition to one another on opposite sides of the track 11.

In FIG. 2 the tray assembly 14 is shown locked in a horizontal, article transporting position by a releasable latch apparatus 24. Latch 24 includes a latch pin 25, mounted on a carriage arm 26 and an index plate or unlatch plate 27 mounted on the tray apparatus 14 as will be described.

A lever arm 28 is pivoted at 29 to the tray assembly 14. The lever arm 28 preferably comprises two ramp arms 30, 31 (FIG. 4) which are laterally spaced and located on opposite sides of the pivot axis of the tray 14, defined by trunions 15 and 16. Each arm 30 and 31 is elongated in shape and extends in a direction parallel to the path of travel of the carriage 13. The ramp arms 30, 31 are connected by a pair of cross braces 32 and 33.

Figure 3:
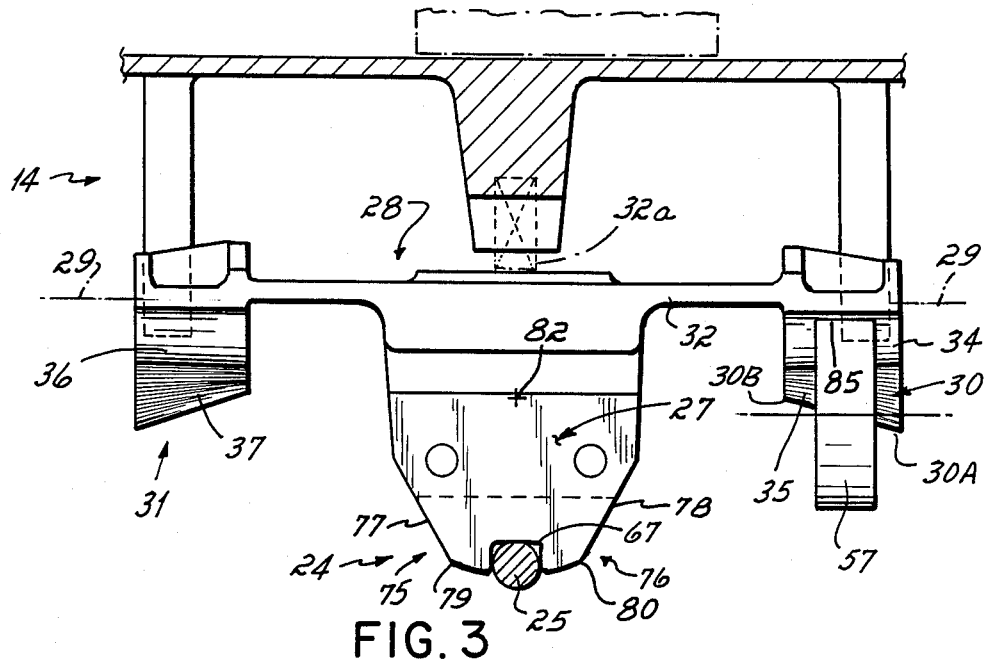
FIG. 3 is an illustrative cross-sectional view taken along lines 3—3 of FIG. 2.

The releasable latch apparatus 24 is mounted on the front cross brace 32. A spring 32A is disposed between the front cross brace 32 and the tray structure such that the lever arm 28 and the index plate 27 is always biased downwardly against the pin 25. The underside of each ramp arm 30 is defined by two cam sections, including a release or unlatch cam section 34 and a tipping cam section 35. For clarity, ramp arm 31 includes unlatch cam section 36 and tipping cam section 37 similar to ramp arm 30 except for the direction of the inward twist of the tipping cam. As shown in FIG. 3 for example, each tipping cam section 35 and 37 are twisted inwardly.

Forward and rearward bumpers 38 and 39 are mounted on the underside of the tray apparatus 14. These bumpers are shown with respective surfaces 40 and 41 on respective carriage arms 26 and 42. When the tray is tipped in a direction toward the viewer of FIG. 2, to limit the tilt angle to about 37°. Similar surfaces are provided on the opposite sides of the arms 26, 42 such that other similar (not shown) bumpers respectively limit the tilting travel of the tray to the other side at the maximum tilt angle of approximately 37°.

By way of further description, it will be appreciated that in the tilt tray sortation conveyors of the type described herein, the tray widths are approximately 20" to about 40", with the typical width being about 32". The tray lengths are generally about 24" and the carriage center to center distance is approximately 27".

With the exception of the lever cam profiles and the latch apparatus, the construction of the carriage 13, tray apparatus 14 and track 11, together with the chain 17, is essentially the same as that described in the aforementioned U.S. Pat. No. 3,510,014.

Figure 2A:
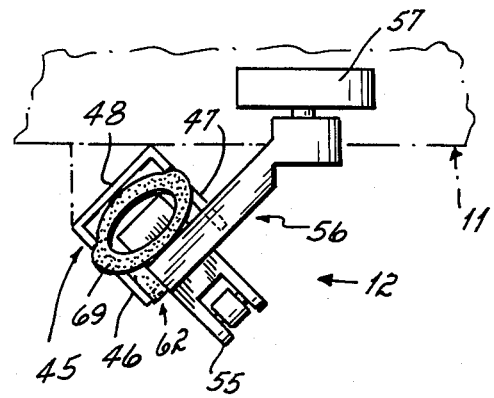
FIG. 2A is a cross-sectional view taken along lines 2A—2A of FIG. 2.
Figure 2B:
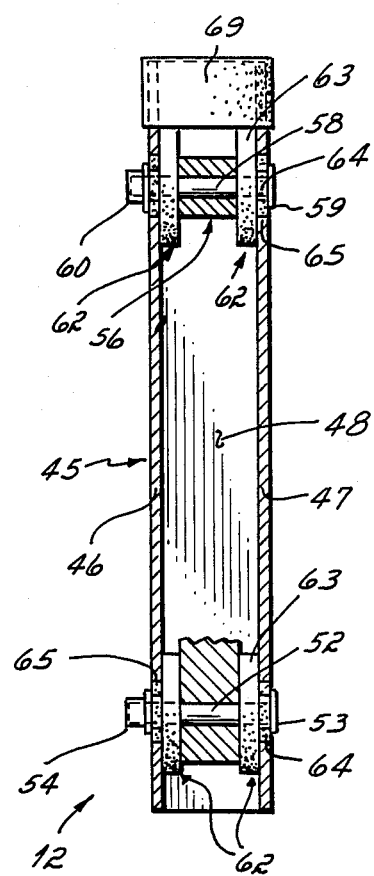
FIG. 2B is a cross-sectional view taken along lines 2B—2B of FIG. 2.

The tip-up apparatus 12 as shown in FIGS. 2, 2A and 2B is similar to that described in the aforementioned U.S. Pat. No. 4,174,773 with the general exception that a double acting pneumatic actuator is utilized in the present application, and with the exception of the shock absorbers as will hereinafter be described. In particular, the tip-up apparatus 12 includes a mounting channel 45 having opposed parallel legs 46 and 47 joined by base web 48. Channel 45 is mounted to the conveyor track 11 by any conventional means such as that shown in the aforementioned U.S. Pat. No. 4,174,773, and so that channel web 48 is preferably disposed in a plane at an angle of about 45° with respect to the direction of carriage travel. Such a mounting angle facilitates the speed at which the tip-up may be moved into and out of interference with the lever arm cam surfaces. Other mounting angles could be used. In addition, a jack screw (not shown) is mounted at the bottom of the channel for precise adjustment of the height of the tip-up mechanism 12 with respect to the track and to the passing carriages 13 and trays 14.

A double acting pneumatic actuator 49, comprising a cylinder 50 and an extensible piston rod 51, is mounted between the legs 46, 47 of the channel. The lower end of the cylinder 50 is mounted on a pin 52 extending between the legs 46, 47 of the channel. Pin 52 has a head 53 and a push cap 54 for maintaining the pin in the channel leg. The upper end of the piston 51 is pivotally secured to a lever arm 55 of a tip-up arm 56. Tip-up arm 56 carries a tip-up roller 57. The tip-up arm 56 is pivoted to the channel 45 by means of the pin 58 extending through the legs 46 and 47, and having a head 59 and a push cap 60 for maintaining the pin in position. It will be appreciated that the pins 52 and 58 lie on an axis which intersects the machine direction MD (FIG. 2) at an included angle of approximately 45°.

Integral shock absorbers 62 are utilized between the channel legs and the lower end of the cylinder 50 and the tip-up arm 56 respectively in order to spread impact forces between the tip-up apparatus 12 and the tiltable tray apparatus 14 over a large section of the channel. These shock absorbers are perhaps best seen in FIGS. 2 and 2B. Each shock absorber is similar and includes a washer-like portion 63 and an integral protruding, hexagonally-shaped boss 64 extending through a similarly shaped aperture 65 in the channel legs. The pins 52 and 58 extend through the center of these shock absorbers as perhaps best seen in FIG. 2B.

In addition to the shock absorber 62, the tip-up apparatus 12 is provided with a further shock absorber 69 in the shape of a resilient annulus mounted on the base web 48 of the channel above the pin 58 absorber 69 is in a position to be engaged by the tip-up arm 56 when it is extended and when it is impacted by a passing carriage 13 and tray 14. The combination of the shock absorbers 62 and 69 tends to eliminate undue wear in the tip-up apparatus and to make the entire tipping operation much quieter than in past structures, even when the linear carriage speeds are increased dramatically, for example to 330 or 500 feet per minute.

Of course, cylinder 50 is provided with fluid ports 70, 71 for extending and retracting the piston 51. Fluid is applied to these ports by an appropriate valve or solenoid, which is electronically controlled through a central processing unit, to selectively activate the tip-up mechanism to discharge an article on the tray apparatus 14 at an appropriate sort location. However, such selective actuation apparatus does not comprise a part of this invention.

Figure 4:
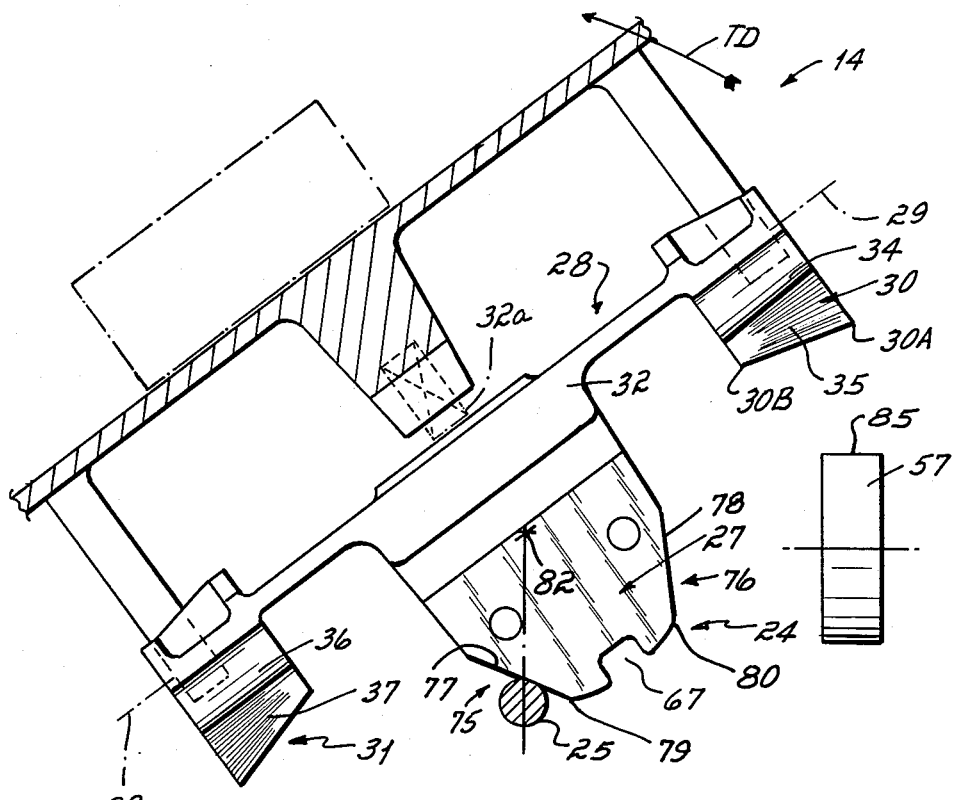
FIG. 4 is a view similar to FIG. 3 but showing the apparatus in tilted configuration.

Returning to FIG. 2, it will be appreciated that as the carriages 13 move in the machine direction, they eventually pass tip-up apparatus 12 which are preferably located on each side of the track 11 approximate a sort location such as the locations 18 through 23 as shown in FIG. 1. When the piston rod 51 of any tip-up 12 not extended, the tip-up roller 57 is disposed in a position (not shown) where it does not interfere with the carriage 13 or tray 14. When the cylinder 50 is selectively actuated, however, so as to tilt a tiltable tray 14 at that location, the tip-up roller 57 is raised to a position as shown in FIG. 2, such that it will engage the unlatch cam 34 and the tipping cam 35 of the lever arm 28 to tilt the tray to the opposite side of the track 11 as show in FIG. 2, and, for example, in the direction of sort location 2A in FIG. 1. The raised tip-up roller 57 initially engages unlatch cam section 34. This causes the lever arm 28 to pivot about pivot 29 against the bias of spring 32A and raise the index plate 27 off the pin 25. When the detent 67 of the index plate 27 clears the pin 25, the tray is thereafter free to tip to a tilted position in the direction urged by the roller 57 as shown in FIG. 4. The tray will generally remain in this position until drawn past an erecting station further downstream beyond the sort locations, and which does not form a part of this invention.

It will be appreciated that the impact of the lever arm 28 on the tip up roller 57 imparts a jolt to the entire tip-up apparatus 12. These forces are carried through the pins 52 and 58 to the channel 45 and it has been found in prior constructions that high carriage speeds will tend to elongate pin mounting apertures in the channel legs and eventually cause shearing of the pins.

This potential difficulty is eliminated by the utilization of the shock absorbers 62. The flat, washer-like portion of the shock absorber 62 tends to spread pressures exerted by the unlatching impact over a wide section of the channel legs. Moreover, the large hexagonal shape of the protruding boss 64 of the shock absorber 62 tends to spread forces transmitted to the pins 52 and 58 over a much larger aperture area and thus eliminates undesirable elongation of the pin mounting holes. Any wear is accommodated by the shock absorbers which can be readily and inexpensively changed as the situation warrants Turning now to FIGS. 3 and 4 it will be appreciated that the latch plate or index plate 27 is provided with a respective cam surface 75, 76 on respective sides of the indent 67. Cam surface 75 is provided with an incline surface 77 and cam surface 76 is provided with an incline surface 78. Incline surface 77 terminates at an intermediate portion 79 of the cam surface 75, while incline surface 78 terminates at an intermediate portion 80 of the cam surface 76.

As noted above, the tray apparatus 14 is tilted about the pivot axis 82, defined by the trunions 15 and 16. It will also be appreciated that the intermediate portions 79 and 80 of the cam surfaces 75 and 76 are located at an angle corresponding to about 15° or less of the tip angle of the tray apparatus 14, and that the intermediate portions 79 and 80 are located at a greater distance from the pivot axis 82 than are other portions of the respective inclines 77 and 78. This structure provides an "overcenter" structure for the latch apparatus 24.

In particular, it will be appreciated from FIGS. 3 and 4 that when the latch plate 27 is lifted from the pin 25, by virtue of engagement of the tip-up roller 57 with the lever arm 28, and the tray is thereafter tilted as shown in FIG. 4, the intermediate section or portion 79 of the cam surface 75 will be rotated toward the pin 25. As the portion 79 passes the pin 25, depending upon the tolerances in the apparatus, the incline portion 77 will tend to ride on the pin 25. As the tray 14 approaches its maximum tilt angle, as shown in FIG. 4, it will be appreciated that the carriage 13 and tray 14 have now moved to a position beyond the tip-up 12. Positive tipping has been completed and the tray is coasting toward its maximum tip angle. At this point in time, the tray is not positively latched nor held in its tilted position as shown in FIG. 4, except by the interaction of the pin 25 on the incline surface 77. In order for the tray to return toward its untipped or horizontal position as shown in FIG. 3, however, the bias of the spring 32A must be overcome. The incline 77, in effect, has to ride up and over pin 25 beyond the intermediate section 79. Accordingly, should the tray be accelerated in a tipped direction to its maximum tilted angle and thereafter attempt to rebound, the rebounding action will be resisted by virtue of the combined incline 77 and the bias of spring 32A.

The tray 14 is positively tipped by the tip-up apparatus 12 through only about 15° to 17° of its initial tilting direction. Thereafter, the tray apparatus 14 has passed the tip-up and the tray coasts in a tilting direction toward its maximum tip angle of about 37° (FIG. 4). Once the lever arm 28 has cleared the tip-up roller 57, if not before, the latch plate 27 engages the pin 25. Nevertheless, once the latch plate intermediate portion 79 passes the pin 25, continued tipping of the tray is not significantly resisted. The angle of the incline 77 when compared to the angular motion of the tray can be used to facilitate tray tipping or to begin to retard tray tipping so that it does not violently rebound.

Of course it will be appreciated, that the particular angulations of the entire cam surfaces 75 and 76, including the incline 77, 78 and intermediate portion 79, 80, can be selected to cooperate together with a bias exerted by the spring 32A to provide frictional resistances to tilting or rebounding motion as may be desired. For example, a further detent could be placed in or near the incline 77, 78 to provide a more positive latch for the tray in its maximum tilted position.

By way of further explanation of the interaction between the tip-up roller and the lever arm 28, it will be appreciated from FIG. 4 that the line 85 illustrates the upward-most extent of the engagement surface of the tip-roller 57. During the positive engagement of the lever arm 28, and more particularly of cams 34 and 35, with the tip-up roller 57, the tray is unlatched and then tipped with an angular tipping acceleration being imparted to the tray which is constant and approximately equal to the acceleration of a free falling body, or about 20 radians per second squared. This angular acceleration is imparted to the tray during positive tray tipping as the carriage 13 and tray 14 are moved past tip-up roller 57. Since the tray is angularly accelerating, it continues to move or coast in circular tilt direction TD as indicated by the arrow in FIG. 4 after it passes tip-up roller 57.

It will also be appreciated from FIG. 2 that the pivot point 29 for the lever arm 28 eventually passes by the tip-up roller 57. After the pivot point 29 passes the tip-up roller 57, continued engagement of the roller 57 with a rearward portion of the tipping cam section 35 tends to pivot the lever arm in an opposite direction and in the same direction as the arm is biased by the spring 32A, depending on the tolerances in the apparatus. This action, however, will continue to positively tip the tray at its constant angular acceleration by virtue of the engagement of the cam surface 75 on pin 25, thus locking the arm 28 against any further pivoting.

Preferably, positive tipping caused by engagement of a cam section 35 with roller 57 continues through about 15° to 17°. Thereafter, the ramp passes roller 57 and the tray coasts to its maximum tilt angle of about 37° which is sufficient for package sliding off the tray.

It will be appreciated that when the unlatching cam section 34 of the lever arm engages the tip-up roller 57, the lever arm 28 is simply pivoted about point 29 and there is no tray tipping until the tray apparatus 14 has been unlatched. Accordingly, the cam surface 34 remains relatively straight and flush with the surface of the roller 57. However, once the tray apparatus 14 is unlatched and tray tilting commences, it is also desirable to maintain a relatively flush engagement between the surface of roller 57 and the tipping cam section 35. This is accommodated by imparting a slight inward twist to the tipping cam surface so that, in general, a line contact is maintained with a roller 57. This twist is illustrated in each of the ramps 30 and 31 in FIG. 3 which shows twisted tipping cam sections 35 and 37, respectively.

As noted in foregoing parts of this application, it is desirable to optimize article discharge for relatively high carriage line speeds. While some attention has been given to the tilt tray function, such as in the aforementioned U.S. Pat. Nos. 3,510,014 and 3,630,394, this present invention contemplates further improvements which provide smoother and even more uniform package discharge for predetermined carriage line speeds.

It will be appreciated that sortation throughput is generally a function of, among other things, carriage line speed. However, when carriage line speeds are increased without attention to the tray tilting operation, problems introduced into the system tend to detract from overall sortation throughput. These include, for example, packages which are catapulted off the rising side of the tray, or which fly due to the dropping out of the descending side of the side from the packages. It is accordingly desirable to provide for positive package control throughout the discharge operation for predetermined high carriage line speeds.

This optimization is believed to be provided not by parabolic or circular-shaped tipping cam sections of the lever arm, but by tipping cam profiles which will provide, for the predetermined line speed, a constant angular acceleration for the package, disposed even at the tray edge, which angular acceleration is approximately equal to 20 radians/sec$^2$. This is accommodated by providing a tipping cam section which corresponds to the profiles or shapes defined by formulas as are hereinafter described.

Moreover, and in place of the simple straight inclined sections in the prior lever arms utilized for unlatching, it has been determined that a smoother unlatching operation can be provided by an unlatching cam section which is in the shape of a parabola and which significantly reduces impact while providing positive unlatching for a predetermined carriage line speed.

In particular, and with reference to one embodiment of the invention, a tilt tray sortation configure is provided having a predetermined carriage or line conveying speed of approximately 330 feet per minute and precisely, 329 feet per minute. In connection with such a conveyor, it has been found that this speed can be accommodated by a foreshortened lever arm of approximately 11.6" in length.

A ramp or cam profile for such an arm is shown in FIG. 5. A reference point 0-0 at which unlatching commences is established for illustration purposes together with a reference line X and a reference line h. Reference line X is a line which constitutes the linear dimension of the ramp arm 30 (FIG. 2) from a point where the tip-up roller 57 would be engaged at 0, to the final point where the tip-up roller 57 disengages from the arm. Reference line h is a reference line indicative of the ramp height or of the change in ramp height from one position on the ramp at one X position to another.

In this particular embodiment, as shown in FIG. 5, it will be appreciated that the unlatching cam section 34 extends from an X dimension of 0" rearwardly for 2", while the positive tipping cam section 35 extends from the X=2" point to the X=11.6" point. The shape or profile of the unlatching cam section 34 is defined by the following formulas:

From X=0" to X=1", $$h = 0.315X^2, \text{ and}$$

From X=1" to X=2"

$$h = 0.315 + 0.560(X-1) - 0.264(X-1)^2.$$

The profile of the tipping cam section 35 is defined as follows:

From X=2" to X=11.6", the outside edge 30A profile of the tipping cam section 35 is:

$$h = 0.595 + 4\text{TAN}(0.002425(X-0.6)^2),$$

and the inside edge 30B profile of the tipping cam section is:

$$h = 0.595 + 2.750\text{TAN}(0.002425(X-0.6)^2),$$

where the outside edges are spaced apart 1.25". It should be appreciated that the outside edge is about 4" from the trunion axis 82, while the inside edge is about 2.75" from axis 82.

These formulas define an unlatching and tipping cam section which is the same for each ramp arm 30 and 31 of lever arm 28, with the exception of the direction of the inward twist as shown in FIG. 3. This profile provides a positive angular acceleration to the tray and any article thereon of about 20 radians/sec$^2$.

By way of further illustration, general approximate design parameters of this embodiment are as follows:
 Tray latch lug face 88 is 5.97" in front of pivot axis 29
 Design arm rotation for unlatching: 4°
 Design tray latch travel: 7/16"
 Design unlatch ramp lift: about 0.91"
 Design positive tray tip angle: 16.8°
 Maximum tray tip speed: 65.8"/sec.
 Design tray width: 26"
 Design package weight: 15 kilograms
 Design tray spacing: 500 millimeters The pivot axis 29 is located at X=6.875" and h=0.250" beneath the X reference line as shown in FIG. 5.

In another embodiment of the invention, a predetermined conveyor line speed is approximately 500 feet per minute. A lever arm corresponding to this particular line speed is approximately 19.25" long and is illustrated in FIG. 6, the pivot shaft is disposed 13" from the ramp front where X=0. The unlatching cam section 34 extends for about X=3" and the tipping cam section 35 of the ramp extends from about x=3" to about X=19.25".

As in the FIG. 5 embodiment, a 0-0 point is established where the lever arm first engages the tip-up roller 57. Reference lines X and h are provided in FIG. 6 similarly to those of FIG. 5, the parameters of which are as follows:

From X=0" to X=1.5"

$$h = 0.1789X^2, \text{ and}$$

From X=1.5" to X=3", $$h = 0.4025 + 0.466(X-1.5) - 0.1555(X-1.5)^2.$$

The profile of the tipping cam section 35 of this embodiment is defined as follows:

From X=3" to X=19.25", the tipping cam section 35 is twisted and includes an outside edge 30A and an inside edge 30B. The outside edge 30A is defined by the formula:

$$h = 0.7516 + 4\text{TAN}(0.001(X-3)^2), \text{ and}$$

the inside edge 30B is defined by the formula:

$$h = 0.7516 + 2.750\text{TAN}(0.001(X-3)^2),$$

where the outside and inside edges re 1.25" apart. As in the other specific embodiment, the outside edge is about 4" from axis 82 and the inside edge is about 2.75" from axis 82.

These formulas define the cam profiles for each ramp arm 30, 31 of a lever arm 28 for this embodiment with the exception of the opposite direction of inward twist.

By way of further illustration general additional approximate design parameters of this embodiment are as follows:

Tray latching lug face is 6.375" in front of pivot axis 29
  Design lever arm rotation for unlatching: 4°
  Design tray latch travel: 7/16"
  Design unlatch ramp lift: 0.91"
  Design positive tray tip angle: 15.13°
  Maximum tray tip speed: 260 ft./min.
  Design tray width: 32"
  Design package weight: 60 lbs.
  Design tray spacing: 27" centers
  The pivot axis 29 is located at X=13", h=0.110" above the X reference line.

In each of the formulas for each of the embodiments illustrated in FIGS. 5 and 6 and as noted above, the line speed of the conveyor is taken into account, so as to provide for constant angular acceleration of the tray and articles thereon.

Such angular acceleration has a maximum value such that any tangent and acceleration applied to the tray and article thereon has a maximum valve approximately equal to or less than the gravity induced acceleration of a free-falling body.

While two preferred embodiments of the invention have been described, it will be appreciated that the shape of the tipping cam sections of the lever arms do not follow the shape of a parabola or of a circular segment. Instead, they follow the shapes as described in order to provide the most efficient constant angular acceleration in the proper direction to result in positive package control. Such acceleration permits the packages to slide off the tray to a sort location, rather than being catapulted for flight in the general direction thereof. Discharge for the predetermined line speeds is thus optimized and the width of the sort locations or discharge chutes can be held to a minimum with increased carriage line speed, thereby increasing overall sortation throughput. It will be appreciated that the appropriate profile can be provided by mathematical calculation to provide constant tray tipping angular acceleration for any predetermined line speed thereby to optimize package discharge and retain the desired parameters as discussed herein.

It should also be appreciated that the inclination or angle of incidence of cam surface 35 determines, in part, the duration of positive tipping by roller 57. Such angle is dependent in part on the location of pivot 29. If the axis 29 is moved slightly upwardly, positive tipping duration is reduced, i.e. the cam surface 35 is tilted slightly upwardly with respect to the roller 57. This results in a lesser maximum tipping acceleration imparted to the tray and consequently, a lower tray edge velocity at the point where the tray is stopped at its maximum tip angle of about 37°. Tray inertia can thus be adjusted to affect rebound by locating pivot point or axis 29 as desired. Thus the angle of incidence of the lever arm can be selected to provide a desired tipping action, assuming, of course, that any necessary adjustment is made for the unlatching operation. Preferably the ramp is tipped upwardly about 2° from front to rear in the conveyor described above operating at about 330 feet per minute.

Also, tray edge speed at a time beyond positive tray tipping and just before maximum tip angle is reached, for a conveyor running at about 330 feet per minute is preferably about 150 to 200 feet per minute.

It should also be appreciated that the tip-up apparatus cycle must be accommodated between the succeeding lever arms. A tip-up must be able to extend and retract so as to affect only one tray when the next tray must remain level or be tipped to the opposite side. Thus a tip-up cycle must be performed in the time it takes a tray to move a distance equal to tray center-to-center spacing, less the length of a lever arm ramp. The horizontal position of the lever pivot 29 can be selected to advance or retard the tray tipping operation for each tray and the predetermined design location of the tip-up relative to the sort location. The overall length of the lever arm tipping cam surface is selected to provide positively tipped constant angular tray acceleration sufficient to tip the tray to its maximum tip angle of about 37° in the desired time frame depending on the predetermined carriage or conveyor line speed.

These and other modifications, alterations and adjustments will become readily apparent to those or ordinary skill in the art without departing from the scope of this invention, and the applicant intended only to be bound only by the claims appended hereto.

We claim:

1. A method for sorting articles from a tilt tray conveyor into predetermined sort locations including the steps of:
   operating the conveyor at a speed approximately equal to a predetermined line speed; and
   positively tipping an article carrying tray proximate a predetermined sort location at a constant angular acceleration to discharge an article thereon into said sort location; and
   the constant angular acceleration being such that the tangential acceleration at the outermost portions of the tray is less than or equal to the acceleration of a free falling body at all times during said step of positively tipping said tray.

2. A lever arm for use with a tilt tray assembly in a tilt tray sortation conveyor of the type having a plurality of tiltable tray assemblies mounted on carriages for conveying articles to be sorted along a plurality of possible sort locations, for selectively and discharging articles therefrom into a sort location, each arm adapted for pivotal mounting to a tray assembly for engagement by a tip-up means to unlatch and tip said tray assembly, said lever arm having:
   a ramp including a tipping cam surface means for tilting said trays at a selected sort location to discharge an article thereon to the selected sort location, said tipping tray cam surface means having a profiled defined as a function of a predetermined carriage speed for imparting to an associated tray a constant angular tipping acceleration, the magnitude of the constant angular acceleration being such that the maximum linear acceleration of any point on the tray tangent to the tipping angle is equal to or less than the acceleration of a free falling body at all times during the tilting of said tray assembly.

3. In a tilt tray sortation apparatus having a carriage adapted for a linear velocity of about 500 feet per minute and a lever arm pivoted to said tray having a ramp for unlatching said tray and for tilting said tray when engaged by a selectively operable tip-up at a sort location, an improved tipping cam surface on said lever arm ramp for engagement by said tip-up for tray tipping, said improved tipping cam surface having a forward end, a rearward end, an outside edge defined by the formula:

$$h=0.7516+4.00 \text{ TAN } (0.001(X-3)^2);$$

and an inside edge defined by the formula:

$$h=0.07516+2.75 \text{ TAN}(0.001(X-3)^2);$$

where the inside and outside edges are 1.25" apart; and where X equals a linear dimension measured along the ramp surface from front to rear, and h equals the height of the cam surface at any given point on the tipping cam surface.

4. The improvement of claim 3 wherein the ramp includes an unlatching cam surface of about $X=3''$ and a tipping cam surface of about $X=16.25''$.

5. Apparatus as in claim 3 wherein said lever arm ramp includes an improved tray unlatching cam surface, forward of the forward end of said tipping cam surface, for engagement by said tip-up to unlatch said lever arm for tray tilting, wherein for $X=0''$ to $X=1.5''$ the profile of said unlatching cam surface is defined by the parabola corresponding to the formula:

$$h=0.1789X^2; \text{ and}$$

wherein for $X=1.5''$ to $X=3''$ the profile of the unlatching cam surface is defined by the formula:

$$h=0.4025+0.466(X-1.5)-0.1555(X-1.5)^2;$$

where X equals a linear dimension measured along the ramp from front to rear, and h equals the height of the unlatching surface at any given X point on the unlatching cam surface.

6. A tilt tray sortation apparatus having a carriage adapted for a linear velocity of about 330 feet per minute and a lever arm pivoted to said tray having a ramp for unlatching said tray and for tilting said tray when engaged by a selectively operable tip-up at a sort location, an improved tipping cam surface on said lever arm ramp for engagement by said tip-up for tray tipping, said improved tipping cam surface having a forward end, a rearward end, an outside edge defined by the formula:

$$h=0.595+4.00 \text{ TAN } (0.002425(X-0.6)^2);$$

and an inside edge defined by the formula:

$$h=0.0595+2.75 \text{ TAN}(0.002425(X-0.6)^2);$$

where the inside and outside edges are 1.25" apart; and where X equals a linear dimension measured along the ramp surface from front to rear, and h equals the height for any given point on the tipping cam surface.

7. The improvement of claim 3 wherein the ramp includes an unlatching cam surface of about $X=2''$ and a tipping cam surface of about $X=11.6''$.

8. Apparatus as in claim 6 wherein said lever arm ramp includes an improved tray unlatching cam surface, forward of the forward end of said tipping cam surface, for engagement by said tip-up to unlatch said lever arm for tray tilting wherein for $X=0''$ to $X=1''$ the profile of said unlatching surface is defined by the parabola corresponding to the formula:

$$h=0.315X^2; \text{ and}$$

wherein for $X=1''$ to $X=2''$ the profile of the unlatching surface is defined by the formula:

$$h=0.315+0.560(X-1)-0.264(X-1)^2;$$

where X equals a linear dimension measured along the ramp from front to rear, and h equals the height of the unlatching surface at any given X point on the unlatching cam surface.

9. A lever arm for a tilt tray sortation conveyor having a plurality of tiltable trays mounted on carriages for conveying articles to be sorted past a plurality of possible sort locations, said lever arm linked to the tray and positioned thereon for selective engagement by cam lever tipping means adjacent a sort location for tilting said trays at a selected sort location to discharge an article thereon to the selected sort location, said lever arm having tipping tray cam surface means having a profile defined as a function of a predetermined carriage speed for imparting to an associated tray a constant angular acceleration, the magnitude of the constant angular acceleration being such that the maximum linear acceleration of any point on the tray tangent to the tipping angle is equal to or less than the acceleration of a free falling body at all times during the tilting of said tilt tray.

* * * * *

UNITED STATES PATENT AND TRADEMARK OFFICE
CERTIFICATE OF CORRECTION

PATENT NO. : 4,856,642

DATED : August 15, 1989

INVENTOR(S) : Robert J. Nicholson, Anthony D. Jape

It is certified that error appears in the above-identified patent and that said Letters Patent is hereby corrected as shown below:

Column 14, line 26, "or" should be --of--.

Column 14, line 28, "intended" should be --intends--.

Signed and Sealed this

Thirty-first Day of July, 1990

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,856,642

DATED : August 15, 1989

INVENTOR(S) : Robert J. Nicholson et al

It is certified that error appears in the above-identified patent and that said Letters Patent is hereby corrected as shown below:

Col. 16, line 14, delete "3" insert --6--.

Signed and Sealed this

Second Day of February, 1993

*Attest:*

STEPHEN G. KUNIN

*Attesting Officer*  *Acting Commissioner of Patents and Trademarks*

UNITED STATES PATENT AND TRADEMARK OFFICE
CERTIFICATE OF CORRECTION

PATENT NO. : 4,856,642

DATED : August 15, 1989

INVENTOR(S) : Nicholson et al

It is certified that error appears in the above-identified patent and that said Letters Patent is hereby corrected as shown below:

Col. 16, line 16, delete "11.6" insert --9.6--.

Signed and Sealed this

Fourth Day of May, 1993

Attest:

MICHAEL K. KIRK

*Attesting Officer*   Acting Commissioner of Patents and Trademarks